Jan. 5, 1932.  T. LORD  1,839,237
WHEEL
Filed March 16, 1929

Thomas Lord
INVENTOR.

BY

ATTORNEYS.

Patented Jan. 5, 1932

1,839,237

UNITED STATES PATENT OFFICE

THOMAS LORD, OF ERIE, PENNSYLVANIA, ASSIGNOR TO HUGH C. LORD, OF ERIE, PENNSYLVANIA

WHEEL

Application filed March 16, 1929. Serial No. 347,485.

This invention is directed to improving wheels and is particularly useful for car wheels. The purpose of the invention is to insulate the tread of the wheel from the body of the wheel by a cushioning and sound-deadening medium, such as rubber. Features and details of the invention will appear from the specification and claims.

A preferred embodiment of the invention is illustrated in the accompanying drawings as follows:—

Figure 1:
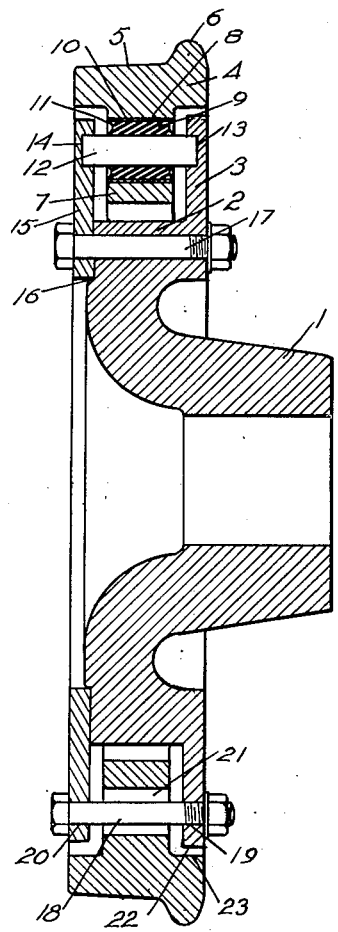
Figure 2:
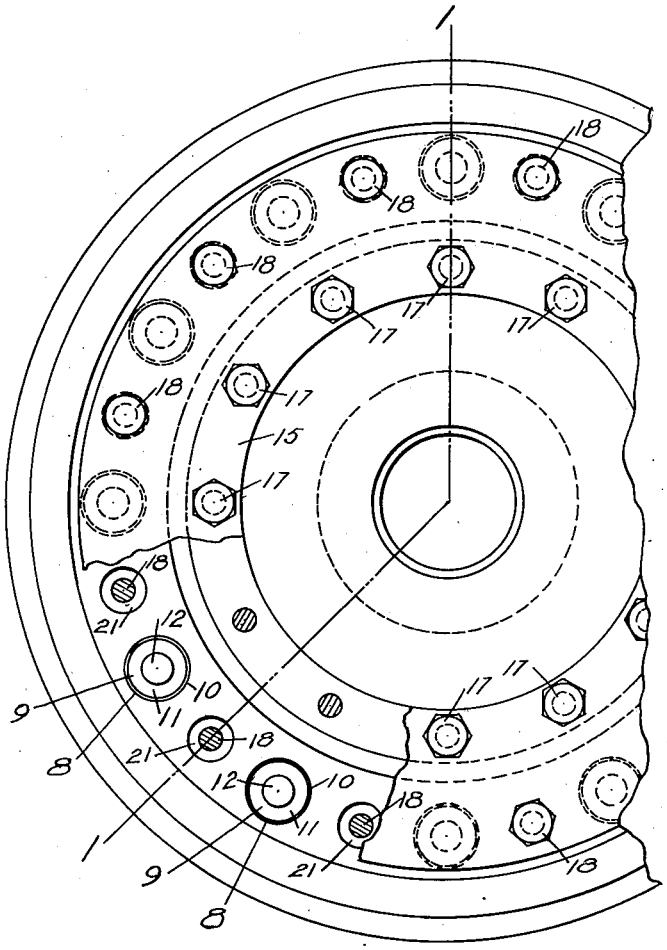

Fig. 1 is a sectional view on the line 1—1 in Fig. 2.

Fig. 2 a side elevation of the wheel.

1 marks the hub of the wheel. This is provided with a cross flange 2 from one end of which extends a radial flange 3. The wheel tread, or rim, 4, as shown, is provided with a track surface 5 and flange 6.

The tread 4 has a peripheral internal flange 7 and this is provided with a series of openings 8 extending around the wheel. Rubber joints 9 are arranged in these openings, these joints comprising an outer shell 10 which is pressed into the opening 8, a rubber insert 11, and a central pin 12, the rubber insert being locked on the pin and shell preferably by surface bonding.

The inner ends of the pins 12 extend into sockets 13 and the outer ends of the pins 12 extend into sockets 14, the sockets 14 being arranged in an annular plate 15. The annular plate 15 rests on a shoulder 16 and is clamped against the flange 2 by bolts 17, these bolts extending through the plate 15 and the flange. Bolts 18 also extend through openings 19 in the flange 3 and openings 20 in the plate 15. These bolts extend through openings 21 in the flange 7. The purpose of the bolts 18 is to bottom the pin 12 in the sockets 13 and 14 and securely clamp these pins in place.

In order to limit the radial movement of the tread relatively to the hub portion the periphery 22 of the flange 3 is spaced from the shoulder 23 of the tread so as to give such clearance that the cushioning effect of the rubber may be fully realized under all normal conditions but under abnormal or rupturing strains the radial action on the joints may be limited. Likewise the spaces between the sides of the flange 7 and the flange 3 and plate 15 should be so proportioned as to provide for the desired cushioning effect of the joints in an axial direction yet should limit this movement within safe limits so far as the rupture of the rubber is concerned, or so far as track conditions may require. Under all normal conditions, however, the entire load and thrusts of the wheel are communicated from one portion of the wheel to the other through the rubber.

Where the rubber is vulcanized directly to the pin and shell it is placed under a very decided initial tension upon cooling and the rubber under these conditions more thoroughly deadens the sound than when under compression. Enough joints are provided ordinarily so that the normal loads are carried on the tension side of these joints and normally there is no rubber under actual compression.

What I claim as new is:—

1. In a wheel, the combination of a peripheral member and a hub member; rubber joints between the members comprising axially extending pins and rubber bushings on the pins; means securing the pins to one member comprising opposing walls with pin sockets receiving the pins, the walls of the sockets engaging the pins endwise; and means securing the bushings in the other member.

2. In a wheel, the combination of a peripheral member and a hub member; rubber joints between the members comprising axially extending pins and rubber bushings on the pins; means securing the pins to one member comprising opposing walls with pin sockets receiving the pins, the walls of the sockets engaging the pins endwise and devices exterior of the pins clamping the opposing walls axially on the pins; and means securing the bushings in the other member.

3. In a wheel, the combination of a peripheral member and a hub member; rubber joints between the members comprising axially extending pins and rubber bushings on the pins; means securing the pins in the hub member comprising opposing walls with pin sockets receiving the pins, the walls of the sockets engaging the pins endwise; and means securing the bushings in the peripheral member.

4. In a wheel, the combination of a peripheral member and a hub member; rubber joints between the members comprising axially extending pins and rubber bushings on the pins; means securing the pins in the hub member comprising opposing walls with pin sockets receiving the pins, the walls of the sockets engaging the pins endwise and devices exterior of the pins clamping the opposing walls axially on the pins; and means securing the bushings in the peripheral member.

5. In a wheel, the combination of a peripheral member and a hub member; rubber joints between the members comprising axially extending pins and rubber bushings on the pins; means securing the pins to one member comprising opposing walls, one of the walls being annular and having pin-receiving sockets receiving the pins, the walls of the sockets engaging the pins endwise; and means drawing the opposing walls together to clamp the pins.

6. In a wheel, the combination of a peripheral member and a hub member; rubber joints between the members comprising axially extending pins and rubber bushings on the pins; means securing the pins to one member comprising opposing walls, both of the walls being annular and having pin-receiving sockets receiving the pins, the walls of the sockets engaging the pins endwise; and means drawing the opposing walls together to clamp the pins, both of said walls being annular.

7. In a wheel, the combination of a hub member and a peripheral member; rubber joints between said members comprising axially extending pins and rubber bushings on the pins; means securing the pins to one member comprising annular opposing walls with opposing pin sockets receiving the pins, the walls of the sockets engaging the pins endwise; and bolts extending through the clamping walls exterior of the pins and clamping the pins in the sockets.

In testimony whereof I have hereunto set my hand.

THOMAS LORD.